US006905413B1

(12) United States Patent
Terao et al.

(10) Patent No.: US 6,905,413 B1
(45) Date of Patent: Jun. 14, 2005

(54) MUSIC GAME SYSTEM

(75) Inventors: Shin Terao, Akashi (JP); Tadashi Kitagawa, Kobe (JP); Hiroki Ishida, Kobe (JP); Nobuo Tomita, Kobe (JP)

(73) Assignee: Konami Corporation, Tokyo (JP)

( * ) Notice: Subject to any disclaimer, the term of this patent is extended or adjusted under 35 U.S.C. 154(b) by 576 days.

(21) Appl. No.: 09/635,053

(22) Filed: Aug. 9, 2000

(30) Foreign Application Priority Data

Aug. 10, 1999 (JP) ........................................ 11-226028

(51) Int. Cl.[7] ............................................ A63F 13/00

(52) U.S. Cl. ............................ 463/40; 434/250; 463/1; 463/7

(58) Field of Search ............................ 434/247, 307 A, 434/308, 309, 319, 250; 463/1, 7, 40–42

(56) References Cited

U.S. PATENT DOCUMENTS

| | | | | | |
|---|---|---|---|---|---|
| 4,720,789 A | * | 1/1988 | Hector et al. | 364/410 |
| 5,020,101 A | | 5/1991 | Brotz et al. | |
| 5,405,153 A | | 4/1995 | Hauck | |
| 6,001,013 A | * | 12/1999 | Ota | 463/7 |
| 6,084,168 A | * | 7/2000 | Sitrick | 84/477 R |
| 6,116,908 A | * | 9/2000 | Takai | 434/250 |
| 6,227,968 B1 | * | 5/2001 | Suzuki et al. | 463/7 |
| 6,336,891 B1 | * | 1/2002 | Fedrigon et al. | 482/8 |
| 6,379,244 B1 | * | 4/2002 | Sagawa et al. | 463/7 |

FOREIGN PATENT DOCUMENTS

| | | |
|---|---|---|
| EP | 0933906 | 8/1999 |
| JP | 06-289875 | 10/1994 |
| JP | 10-187148 | 7/1998 |
| JP | 11-88557 | 3/1999 |
| JP | 11-169559 | 6/1999 |
| WO | WO98/15329 | 4/1998 |

OTHER PUBLICATIONS

The newspaper "Nihon Keizai Shimbun", published on Feb. 14, 1999, by Nihon Keizai Shimbun Co. publications, p 7.

* cited by examiner

*Primary Examiner*—Jessica Harrison
*Assistant Examiner*—Robert Mosser
(74) *Attorney, Agent, or Firm*—Jordan and Hamburg LLP

(57) ABSTRACT

Each of communication controllers sends a count value of a timer corresponding to the lapse of time from a starting point of reproduction during the reproduction of a music to a communication cable. Each of game controllers calculates, while a multi-play mode is executed in an other game apparatus, a reproducing position of the music in the other game apparatus based on the count value sent from the communication controller and transfers a music data from the calculated reproducing position on to a sound source memory upon the receipt of an instruction signal outputted from a confirmation button of an instructing section and representing confirmation of selection of the multi-play mode. While one game player is playing a music game, another game player can participate in this game in the middle of a music number.

20 Claims, 9 Drawing Sheets

MUSIC GAME SYSTEM

BACKGROUND OF THE INVENTION

This invention relates to a music game system in which music is made audible to a game player, and particularly to a music game system in which a plurality of music game apparatus are connected via a communication path so that a plurality of game players can simultaneously enjoy the game.

Quite many game systems have been proposed. These game systems include systems comprised of a special apparatus for home use and a television monitor and systems comprised of a special apparatus for commercial use, a personal computer or a workstation, a display and a sound output device. These systems are generally provided with a controller operated by a game player, a storage medium storing a game program, a CPU for executing controls to generate sounds and images based on the game program, an image processor for generating images, an audio processor for generating sounds, a monitor for displaying images, and a loudspeaker for making the sounds audible. CD-ROMs, semiconductor memories, cassettes containing built-in semiconductor memories, etc. are frequently used as the storage medium.

Among these game systems, especially comprised of a special apparatus for commercial use, those in which a plurality of game apparatus are connected by a communication line so that a plurality of game players can simultaneously enjoy a game are known. With this game system, a plurality of game players can compete by playing the same game.

In the above conventional game systems, it has been a general practice for a plurality of game players to simultaneously start the game. Particularly, known music games including dancing games in which music is played as a background music are only those which are simultaneously started by all game participants by starting the reproduction of a music number from the beginning. There has not been developed any game system in which, after a certain game player started a game, another game player can participate in the game in the middle of the music number.

SUMMARY OF THE INVENTION

It is an object of the present invention to provide a music game system which is free from the problems residing in the prior art.

According to an aspect of the invention, a music game system comprises: a first music game apparatus for reproducing a music for a first player; and a second music game apparatus communicable with the first music game apparatus by way of a communication path for reproducing a music for a second player.

The first music game apparatus is provided with: a first music data storage device for storing music data of a music number; a first music reproducer for reproducing the music for the music number based on the music data stored in the first music data storage device; a first start instructor for instructing the start of reproduction of the music number by the first music reproducer; a first reproduction controller for transferring the music data from the first music data storage device to the first music reproducer upon the receipt of an instruction from the first start instructor; and a first count value output device for outputting to the communication path a count value corresponding to the lapse of time from a starting point of the reproduction when the reproduction of the music number is started by the first music reproducer.

The second music game apparatus is provided with: a second music data storage device for storing the same music data as the first music data storage device; a second music reproducer for reproducing the music for the music number based on the music data stored in the second music data storage device; a second start instructor for instructing the start of reproduction of the music by the second music reproducer; a second reproducing position calculator for receiving the count value outputted from the first count value output device via the communication path upon the receipt of an instruction from the second start instructor, and calculating a reproducing position of the music number being reproduced by the first music reproducer using the received count value; and a second reproduction controller for transferring the music data after the reproducing position calculated by the second reproducing position calculator from the second music data storage device to the second music reproducer.

According to another aspect of the invention, also, a music game system comprises: a first music game apparatus for reproducing a music for a first player; and a second music game apparatus communicable with the first music game apparatus by way of a communication path for reproducing a music for a second a player.

The first music game apparatus includes: a first music data storage device for storing music data of a music number; a first music reproducer for reproducing the music for the music number based on the music data stored in the first music data storage device; a first start instructor for instructing the start of reproduction of the music number by the first music reproducer; a first reproduction controller for transferring the music data from the first music data storage device to the first music reproducer upon the receipt of an instruction from the first start instructor; and a first count value output device for outputting to the communication path a count value corresponding to the lapse of time from a starting point of the reproduction when the reproduction of the music number is started from the beginning by the first music reproducer.

The second music game apparatus includes: a second music data storage device for storing the same music data as the first music data storage device; a second music reproducer for reproducing the music for the music number based on the music data stored in the second music data storage device; a second start instructor for instructing the start of reproduction of the music number by the second music reproducer; a second reproduction controller for transferring the music data from the second music data storage device to the second music reproducer upon the receipt of the instruction from the second start instructor; a second count value output device for outputting to the communication path a count value corresponding to the lapse of time from a starting point of the reproduction when the reproduction of the one music number is started from the beginning by the second music reproducer.

Further, the first music game apparatus is provided with a first reproducing position calculator for obtaining the count value upon the receipt of the instruction from the first start instructor if the count value is outputted from the second count value output device to the communication path, and calculating a reproducing position of the music number being reproduced by the second music reproducer using the obtained count value. The first reproduction controller transfers the music data after the reproducing position calculated by the first reproducing position calculator from the first music data storage device to the first music reproducer upon the receipt of the instruction from the first start instructor if the count value is outputted from the second count value output device to the communication path.

The second music game apparatus is further provided with a second reproducing position calculator for obtaining the count value upon the receipt of the instruction from the second start instructor if the count value is outputted from the first count value output device to the communication path, and calculating a reproducing position of the music number being reproduced by the first music reproducer using the obtained count value. The second reproduction controller transfers the music data after the reproducing position calculated by the second reproducing position calculator from the second music data storage device to the second music reproducer upon the receipt of the instruction from the second start instructor if the count value is outputted from the first count value output device to the communication path.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
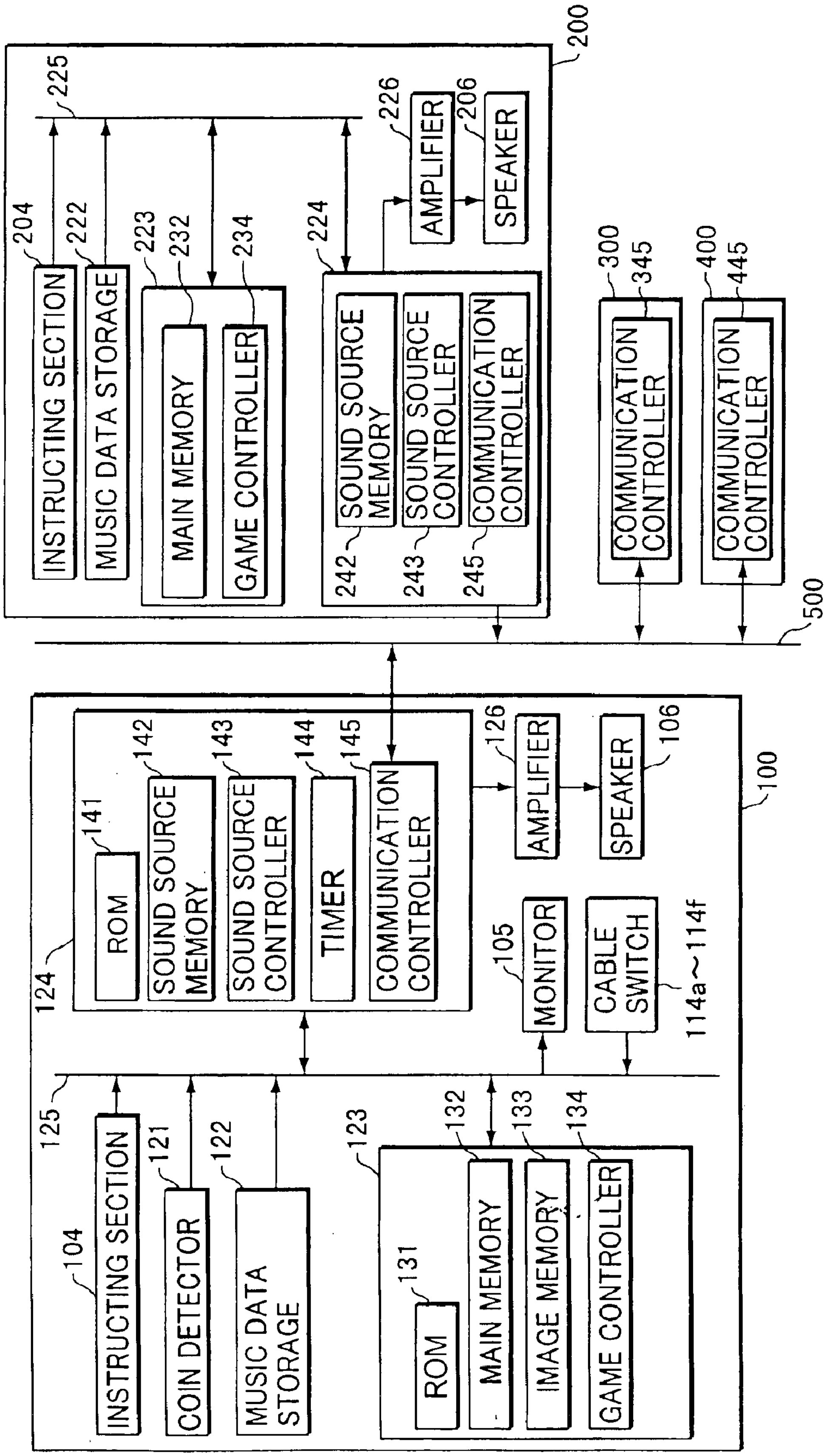
FIG. 1 is a block diagram showing a construction of a dancing game system provided with a communication path according to an embodiment of the invention.
Figure 2:
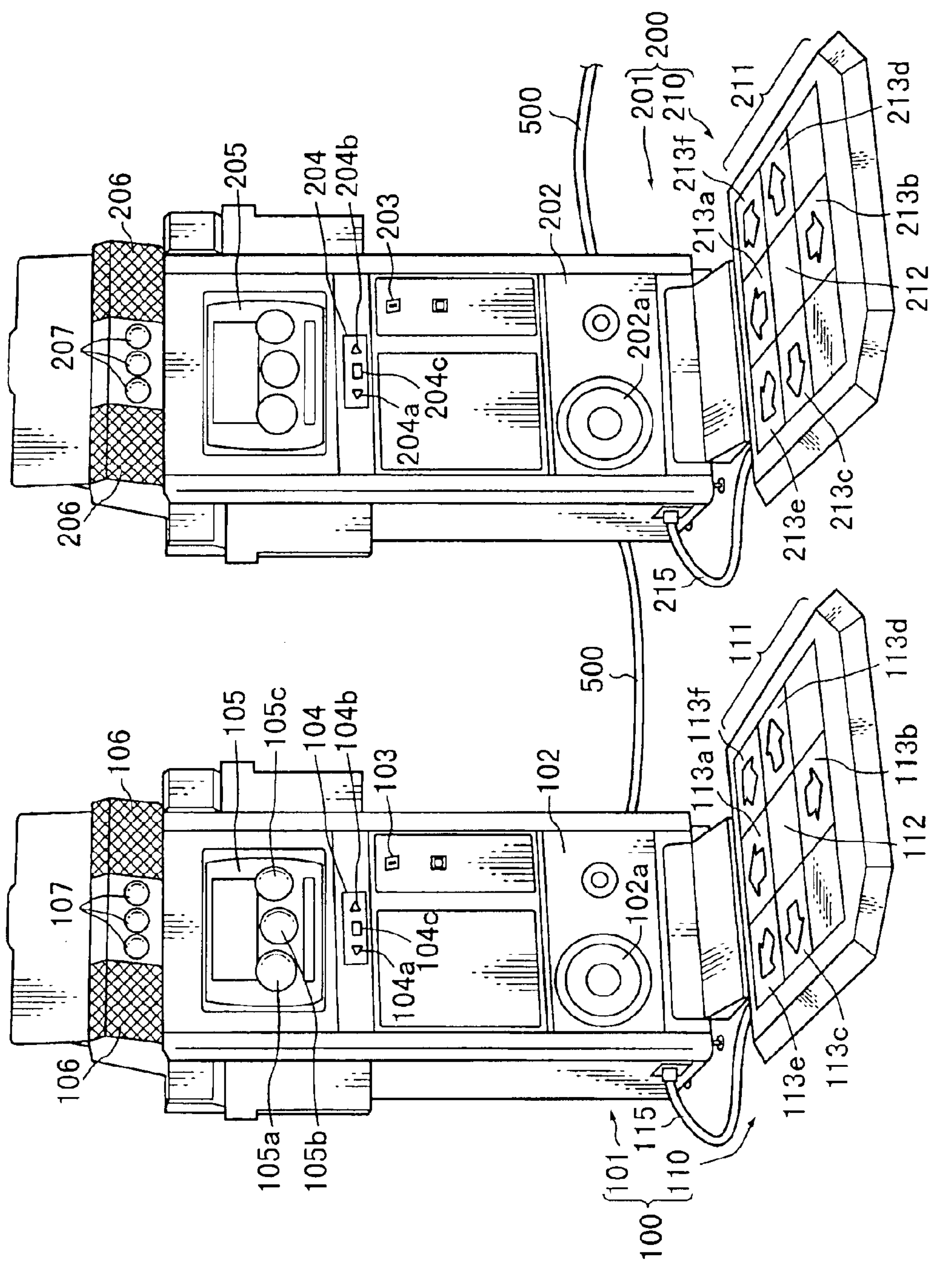
FIG. 2 is a perspective view showing an entire external configuration of the dancing game system.

Referring to FIGS. 1 and 2 showing a dancing game system provided with a communication path according to an embodiment of the invention, a dancing game system is comprised of a first game apparatus 100, a second game apparatus 200, a third game apparatus 300 and a fourth game apparatus 400. The respective game apparatus 100 to 400 are connected with one another via a communication cable 500.

Further, as shown in FIG. 2, the first game apparatus 100 includes a main game unit 101 and a step mat 110 provided in front of the main game unit 101. The first game apparatus and the step mat 110 are connected with each other via a wire 115. Similarly, the second game apparatus 200 includes a main game unit 201 and a step mat 210 provided in front of the main game unit 201. The main game unit 201 and the step mat 210 are connected with each other via a wire 215.

First, a dancing game played in this dancing game system is summarily described. In the first and second game apparatus 100, 200, stepping sections to be stepped and stepping timings are instructed to game players standing on the step mats 110, 210 via images and sounds, and how precisely the game players step the stepping sections in response to the instructions is evaluated and displayed as scores.

For example, if another game player starts the dancing game in a multi-play mode in the second game apparatus 200 while one game player is already playing the dancing game in the multi-play mode in the first game apparatus 100, this game system enables the another game player to participate in the game in the middle by synchronously reproducing the same music number as the one being reproduced in the first game apparatus 100 at the same reproducing position.

The first to fourth game apparatus 100 to 400 have the same construction. In FIG. 1, only essential elements of the second game apparatus 200 are shown, and the detailed internal constructions of the third and fourth game apparatus 300, 400 are not shown. In FIG. 2, the third and fourth game apparatus 300, 400 are not shown.

In FIG. 2, the main game unit 101 includes a rhythm sound output section 102 provided at its bottom portion, a coin slot 103 provided above the rhythm sound output section 102, and an instructing section 104 provided above the coin slot 103, a monitor 105 provided above the instructing section 104, loudspeakers 106 provided at the top and electric lamps 107.

The rhythm sound output section 102 has a rhythm speaker 102*a* for generating a rhythm sound at a specified low frequency, and outputs low-pitched rhythm of the music being reproduced to the game player on the step mat 110 through the rhythm speaker 102*a*, taking advantage of a resonance space provided inside.

The instructing section 104 has a left button 104, a right button 104*b* and a confirmation button 104*c* for permitting the game player to select a game mode and a music number to be reproduced.

The loudspeakers 106 are adapted to reproduce the selected music number, and the electric lamps 107 are turned on and off in synchronism with the reproduced music and the outputted rhythm to improve rhythmic sense.

The step mat 110 is substantially in the form of a flat mat having a specified thickness, and has a dancing area 111 which are divided into 3×3 square sections in forward and backward directions and in transverse directions with respect to the main game unit 101. A center square section of the dancing area 111 is a home position 112, and six square sections to the front, back, left and right and obliquely to the front from the home position 112 are stepping sections 113*a*, 113*b*, 113*c*, 113*d*, 113*e*, and 113*f*. Arrows indicating directions viewed from the home position 112 are written on the stepping sections 113*a* to 113*f*.

In the respective stepping sections 113*a* to 113*f* are provided cable switches 114*a*, 114*b*, 114*c*, 114*d*, 114*e*, 114*f* (see FIG. 1) as stepping motion detector for detecting whether or not the game player has stepped on the stepping section. Each cable switch is, for example, comprised of two conductors and a voltage applying device for applying a voltage between the two conductors. The two conductors are held separated from each other while no load is acting, and they are short-circuited when a load acts. With the cable switch thus constructed, whether or not the game player has stepped on the stepping section can be detected by detecting a voltage level between the two conductors.

The first game apparatus 100 constructs a first music game apparatus, the second game apparatus 200 constructs a second music game apparatus, the communication cable 500 constructs a communication path, the loudspeakers 106 of the first game apparatus 100 construct a first music reproducer, the instructing section 104 thereof constructs a first start instructor, and the stepping sections 113*a* to 113*f* construct first motion inputting sections, the loudspeakers 206 of the second game apparatus 200 construct a second music reproducer, the instructing section 204 thereof constructs a second start instructor, and the stepping sections 213*a* to 213*f* construct a second motion inputting sections.

In FIG. 2, the elements of the first game apparatus 100 are identified by reference numerals in the order of 100, and the elements of the second game apparatus 200 corresponding to those of the first game apparatus 100 are identified by reference numerals in the order of 200 having the same lower two digits. The elements of the second game apparatus 200 are not described here.

In FIG. 1, the first game apparatus 100 is provided with a coin detector 121, a music data storage 122, a main unit 123, a music communication unit 124, etc. and the respective elements are connected with each other via a bus 125. The main unit 123 includes a ROM 131, a main memory 132, an image memory 133 and a game controller 134, whereas the sound source communication unit 124 includes a ROM 141, a sound source memory 142, a sound source controller 143, a timer 144 and a communication controller 145.

The coin detector 121 detects a coin inserted through the coin slot 103 (see FIG. 2), and a detection signal thereof is sent to the game controller 134.

Figure 3:
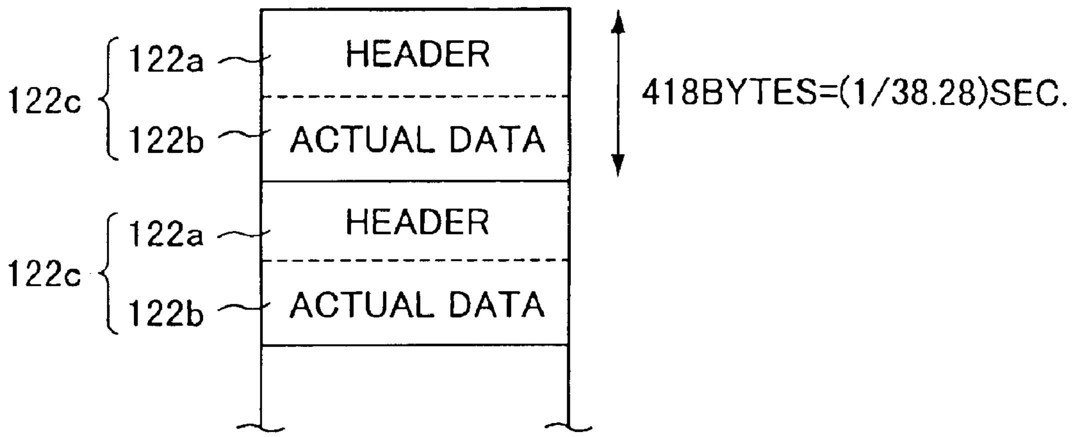
FIG. 3 is a diagram showing a data configuration of a music data stored in a music data storage.

The music data storage 122 is comprised of, e.g., a CD-ROM, hard disk, semiconductor memory or like storage medium for storing music data in the form of digital data. FIG. 3 is a diagram showing a data configuration of the music data stored in the music data storage 122.

As shown in FIG. 3, the music data of a known data configuration having a continuous series of frames 122*c* each comprised of a header portion 122*a* and an actual data portion 122*b* is stored in the music data storage 122. A music data is stored in the actual data portion 122*b* in a compressed manner, and a header data representing data characteristics including a sampling frequency and a channel number of the music data stored in the actual data portion 122*b* is stored in the header portion 122*a*.

A data storage capacity of the frame 122*c* is fixed to a specified bytes (e.g., 418 bytes in this embodiment) and a reproducing time thereof is set at a specified value (e.g., 1/38.28 sec. in this embodiment). The respective frames are independent data blocks, which can be restored to original music waves frame by frame. One music number is reproduced by continuously restoring the frames 122*c* to the music waves.

The data storage capacity of the frame 122*c* is changed according to the sampling frequency and set channel. In this embodiment, this data storage capacity is set at 418 bytes.

Referring back to FIG. 1, music data corresponding to a plurality of music numbers are stored in the music data storage 122 in correspondence with the names of the music numbers. The music data storage 122 constructs the first music data storage device.

The ROM 131 of the main unit 123 is adapted to store a game program for controlling the operation of the game controller 134. In the ROM 131, a stepping position instructing data used to instruct the stepping sections and timings to be stepped by the game player is stored as a game program. The stepping position instructing data corresponds to a rhythm such as simple times such as a simple quadruple time or a simple octuple time, and a plurality thereof are set in the form of a table according to degrees of difficulty.

The number of the tables storing the stepping position instructing data is a sum of the number of the simple times, the number of rhythms of the same simple times, i.e., corresponds to the number of music numbers available. In the case of the simple quadruple time, each stepping position instructing data is constructed by one set of data comprised of four contents of instruction in time series. In the case of the simple octuple time, each stepping position instructing data is constructed by one set of data comprised of eight contents of instruction in time series. In view of rhythm, various stepping position instructing data are prepared in which, in the case of the simple quadruple times, simple times have all the same duration or first two simple times are shorter and the latter two simple times are longer. It is preferable to prepare a plurality of kinds of stepping position instructing data of the same degree of difficulty.

Not only the semiconductor memory, but also a CD-ROM or a hard disk may be used as the ROM 131.

The main memory 132 is comprised of a RAM or EEPROM for temporarily storing the music data and other data. The image data 133 is comprised of a RAM. An image to be displayed on the monitor 105 is written in the image memory 133.

The game controller 134 is constructed by one or more CPUs and input/output circuits, etc. for controlling the entire first game apparatus 100, and has the following nine functions (A1) to (A9).

(A1) Function as a game mode selector for selecting a game mode such as a beginner mode or a multi-play mode. The monitor 105 in FIG. 2 displays a game mode selection screen. For example, an icon 105*a* represents a beginner mode, an icon 105*b* represents a non-stop mode in which a selectable music number is limited to one, and an icon 105*c* represents a multi-play mode in which a plurality of game players can simultaneously play the game. The game mode is selected by moving a cursor (indicated by, e.g., a change in color or luminance) to the left and right by using the left and right buttons 104*a*, 104*b* and confirming the selected game mode by a confirmation button 104*c*.

(A2) Function as a team selector for selecting a team when the multi-play mode is selected as a game mode. A team is selected from a team list (including, e.g., a red team, blue team in this embodiment) displayed on the monitor 105 by operating the left, right and confirmation buttons 104*a*, 104*b*, 104*c*.

(A3) Function as a music number selector for selecting the music number to be reproduced. The name of the music number to be reproduced is selected from a music number list displayed on the monitor 105 by operating the left, right and confirmation buttons 104*a*, 104*b*, 104*c*.

(A4) Function of, when the game is not played in the multi-play mode in the other second to fourth game apparatus 200, 300, 400, receiving an instruction signal outputted from the confirmation button 104*c* of the instructing section 104 and representing confirmation of the selection of the music number as a signal for instructing the start of the music reproduction; transferring the music data corresponding to the name of the selected music number from the music data storage 122 to the main memory 132 in its compressed form; further transferring it to the sound source memory 142 while expanding it to the original data; and sending a signal to the sound source controller 143 to instruct the start of the reproducing operation when a sufficient amount of data to be reproduced is transferred to the sound source memory 142.

(A5) Function of, when the game is played in the multi-play mode in the other second to fourth game apparatus 200, 300, 400, receiving an instruction signal outputted from the confirmation button 104*c* of the instructing section 104 and representing confirmation of the selection of the multi-play mode as a signal for instructing the start of the music reproduction; and calculating a reproducing position of the music number in the other game apparatus(s) based on a count value sent from the communication controller 145. This operation procedure is described later.

(A6) Function of transferring the music data corresponding to a music number code from the calculated reproducing position on from the music data storage 122 to the main memory 132 based on the code and calculated reproducing position of the music number being reproduced in the other second to fourth game apparatus 200, 300, 400; further transferring it to the sound source memory 142 while expanding it to the original data; and sending a signal to the sound source controller 143 to instruct the start of the reproducing operation when a sufficient amount of data to be reproduced is transferred to the sound source memory 142.

(A7) Function as a stepping position instructing data output device for selecting the table of the stepping position instructing data corresponding to the selected music number and outputting one set of data in the selected table to the rhythm speaker 102*a*.

(A8) Function as a first motion instructor for replacing the stepping position instructing data by the stepping position instructing marks for each set of data, writing them in the image memory 133, and scroll-displaying the stepping position indicating marks on the monitor 105 to instruct the stepping sections to be stepped and stepping timings to the game player. On the monitor 105, images of the stepping position instructing marks are constantly scroll-displayed without interruption.

(A9) Function as an evaluator for evaluating the precision of the stepping of the game player in relation to the stepping position instructing data (i.e., whether or not the game player has stepped on the instructed stepping sections at the instructed timings), and displaying the evaluation result as a score on the monitor 105.

In the functions (A4) and (A6), the reproduction starting position may be designated in unit of two bytes when the start of the reproduction is instructed to the sound source controller 143. In such a case, the data up to the next header data are skipped if the designated address is not at the leading end of the header data. Further, if the data can be transferred from the main memory 132 to the sound source memory 142 at a specified speed or faster, i.e., at such a speed to transfer 418 or more bytes of data within 1/38.28 sec., reproduction and transfer can be simultaneously performed without waiting until the transfer of all the data is completed.

The ROM 141 of the sound source communication unit 124 is adapted to store a program for controlling the operation of the sound source controller 143 and the communication controller 145. The sound source memory 142 is comprised of a RAM or EEPROM for temporarily storing the music data.

The sound source controller 143 and the communication controller 145 are constructed by one or more CPUs and input/output circuits, etc. The sound source controller 143 has following three functions (B1) to (B3).

(B1) Function of restoring the music data stored in the sound source memory 142 to music waves of analog signals and outputting them to the loudspeakers 106 via an amplifier 126. By this function, the music is reproduced by the loudspeakers 106.

(B2) Function of calculating the position of the music data being reproduced frame by frame while the music is being reproduced. In other words, which frame the presently reproducing position is located in can be calculated in real time.

(B3) Function of holding a count value P1 of the timer 144 corresponding to a lapse of time following the starting point of the reproduction while the music is being reproduced.

The timer 144 has an oscillating circuit of a specified frequency (e.g., 44.1 kHz in this embodiment) and acts as a counter for outputting a count value corresponding to the lapse of time. The timer 144 makes 44,100 counts within 1 sec.

The communication controller 145 conducts a data communication with the other second to fourth game apparatus 200, 300, 400 and has following three functions (C1) to (C3).

(C1) Function as a first music number information output device for outputting the music number code specifying the music number being reproduced to the communication cable 500 while the music is being reproduced.

(C2) Function as a first count value output device for sending the count value P1 of the timer 144 corresponding to the lapse of time from the starting point of the reproduction to the communication cable 500 upon receiving it from the sound source controller 143 while the music is being reproduced.

(C3) Function of receiving the music number code and the count value outputted from the other second to fourth game apparatus 200, 300, 400 and sending them to the game controller 134 when the multi-play mode is selected in the first game apparatus 100 while the game is being played in the multi-play mode in the other game apparatus 200, 300, 400.

In the first game apparatus 100, the game controller 134 and the sound source controller 143 construct a first reproduction controller, and the game controller 134 and the communication controller 145 construct a first reproducing position calculator.

In FIG. 1, the respective elements of the second to fourth game apparatus 200, 300, 400 have the same functions as the corresponding elements of the first game apparatus 100.

Specifically, the music data storage 222 of the second game apparatus 200 constructs the second music data storage device, the game controller 234 constructs a second motion instructor, the game controller 234 and the sound source controller 243 construct a second reproduction controller, the game controller 234 and the communication controller 245 construct a second reproducing position calculator, and the communication controller 245 constructs a second count value output device.

Figure 4:
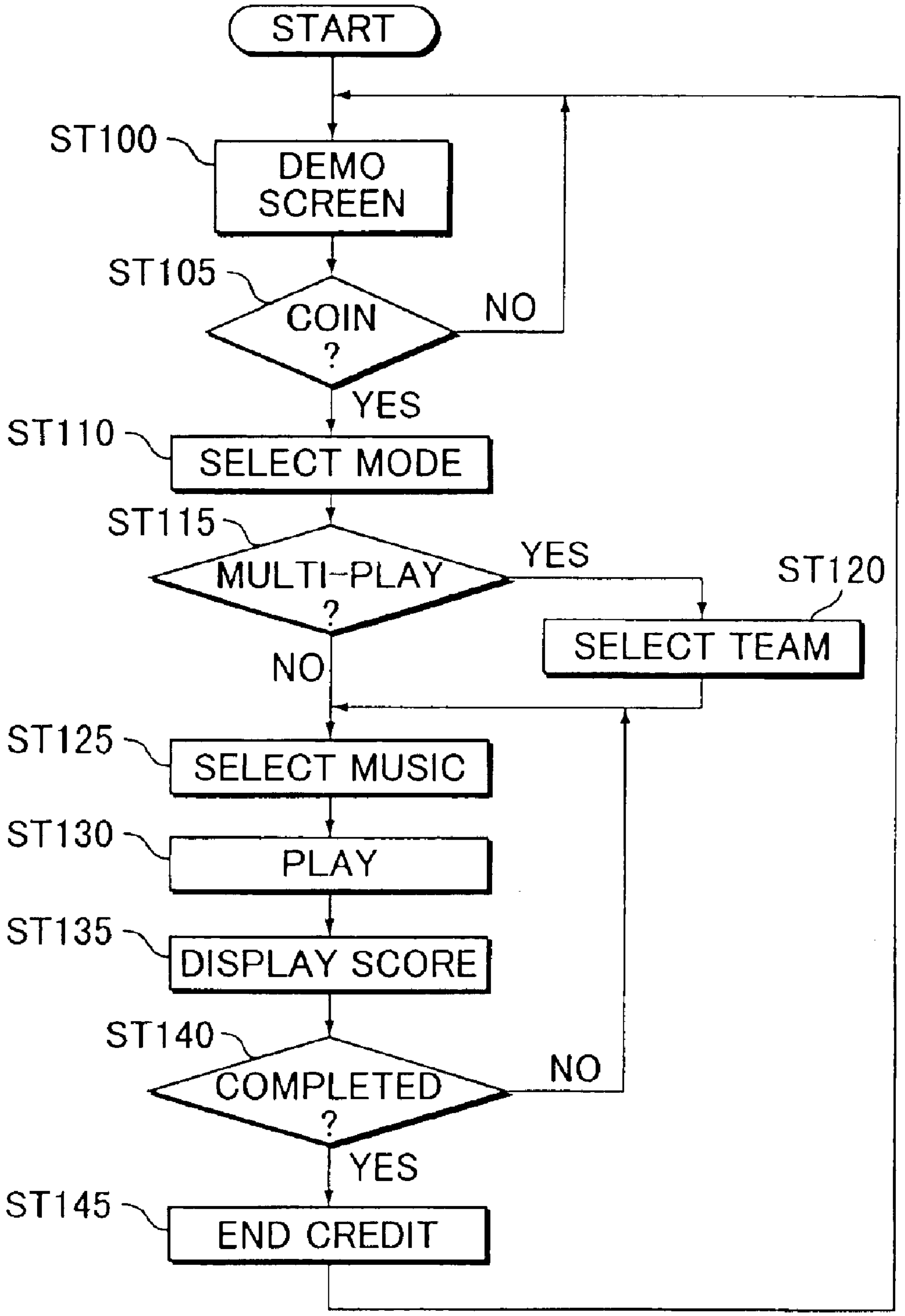
FIG. 4 is a flowchart showing an operation procedure of a single-player game (so-called "1P-game") in which one person plays the game.

Next, an operation procedure of this dancing game system is described. FIG. 4 is a flowchart showing an operation procedure of a single-player game (so-called “1P-game”) in which a single player plays the game. Here, description is given on an example in which the first game apparatus 100 is used.

When the first game apparatus 100 is powered, a demonstration screen is first displayed (Step ST100) and continues to be displayed until a coin is inserted (NO in Step ST105). When the coin is inserted (YES in Step ST105), a game mode selection screen is displayed on the monitor 105 to allow a game player to select a game mode (Step ST110). When the multi-play mode is selected (YES in Step ST115), the music number is selected (Step ST125) after the name of a team is selected (Step ST120). On the other hand, if a game mode other than the multi-play mode is selected (NO in Step ST115), the music number is immediately selected (Step ST125).

Subsequently, the game is started (Step ST130), and a score is displayed based on an evaluation result upon the completion of reproduction of the selected music number (Step ST135). It is then discriminated whether the selected music number has been reproduced by a set number of times, or the set number of reproductions of selected music number are completed (Step ST140). Unless it has been reproduced by the set number of times (NO in Step ST140), this routine returns to Step ST125 and the above operations are repeated. In the case that the non-stop mode is selected as a game mode, there is no selection of the music number for the second and subsequent times.

When the music numbers are reproduced by the set number of times (YES in Step ST140), the display of the demonstration screen follows (Step ST110) after an end credit is displayed (Step ST145).

Figure 5:
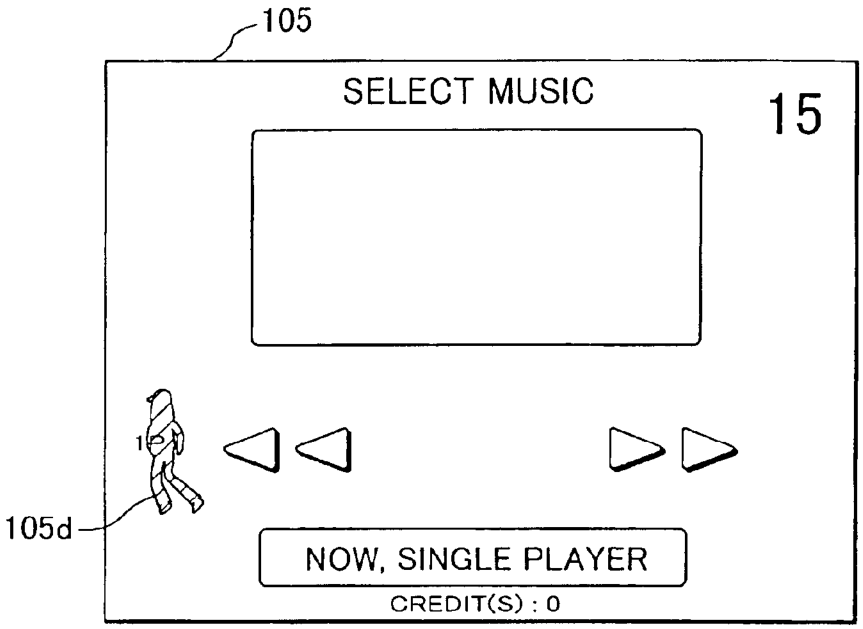
FIG. 5 is a diagram showing an example of a monitor display screen (music selection screen) when a single game player selects a multi-play mode.
Figure 6:
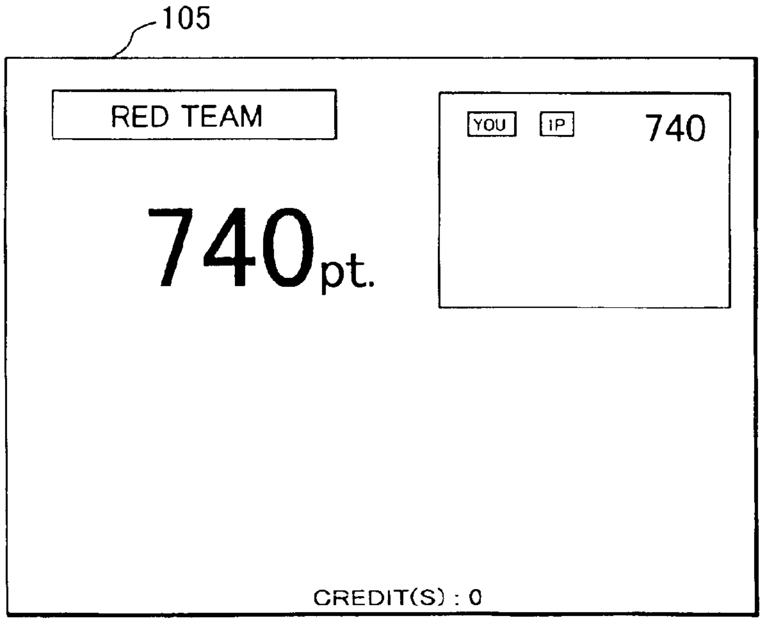
FIG. 6 is a diagram showing an example of the monitor display screen (score screen) when the single game player selects a multi-play mode.

FIGS. 5 and 6 are diagrams showing examples of the monitor display screen when a single game player selects a multi-play mode. FIG. 5 shows a music number selection screen and FIG. 6 shows a score screen.

Figure 7:
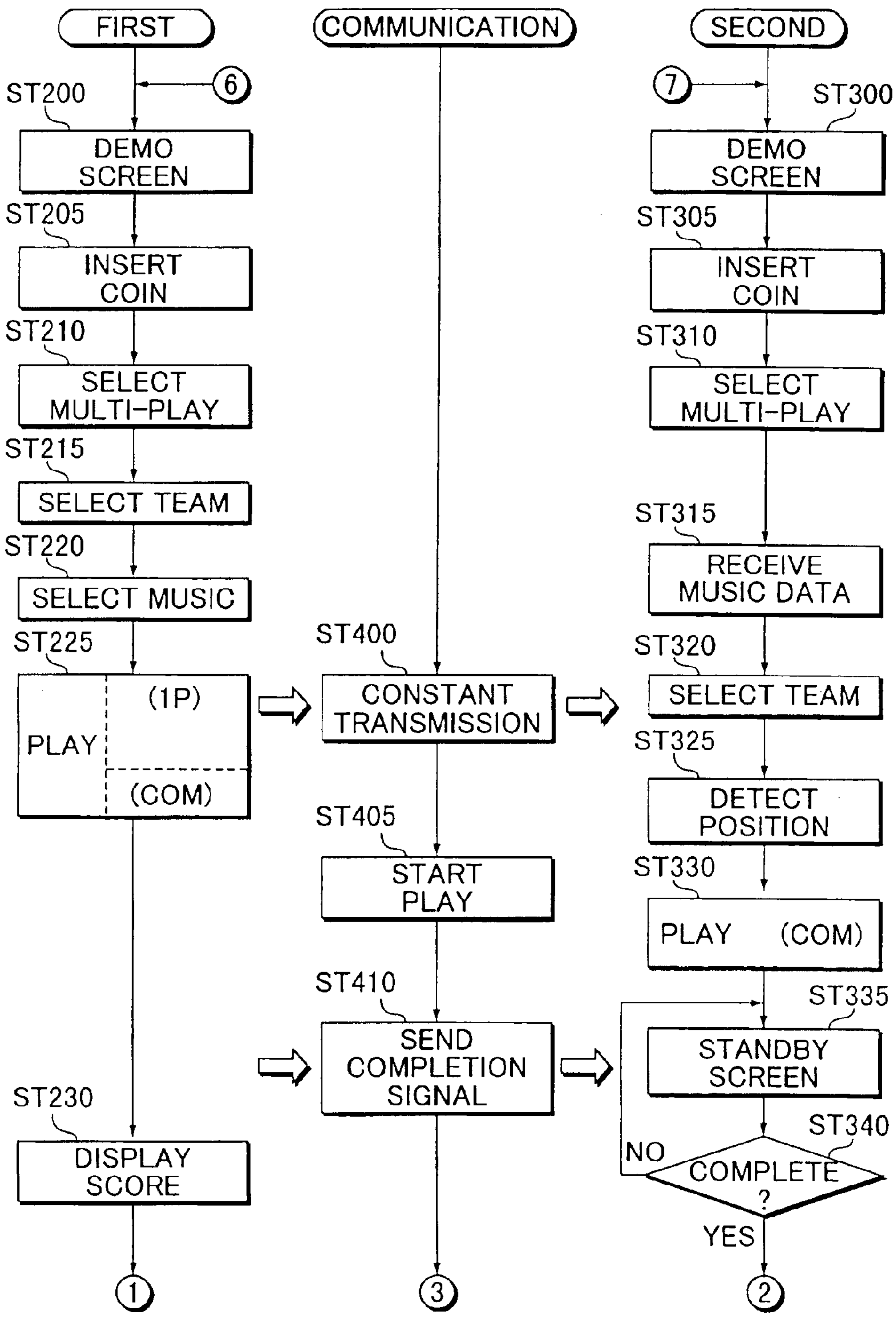
FIGS. 7 and 8 are a flowchart showing an operation procedure in the case that, while one game player is playing a game in the multi-play mode, another game player selects the multi-player mode to participate in the middle.
Figure 8:
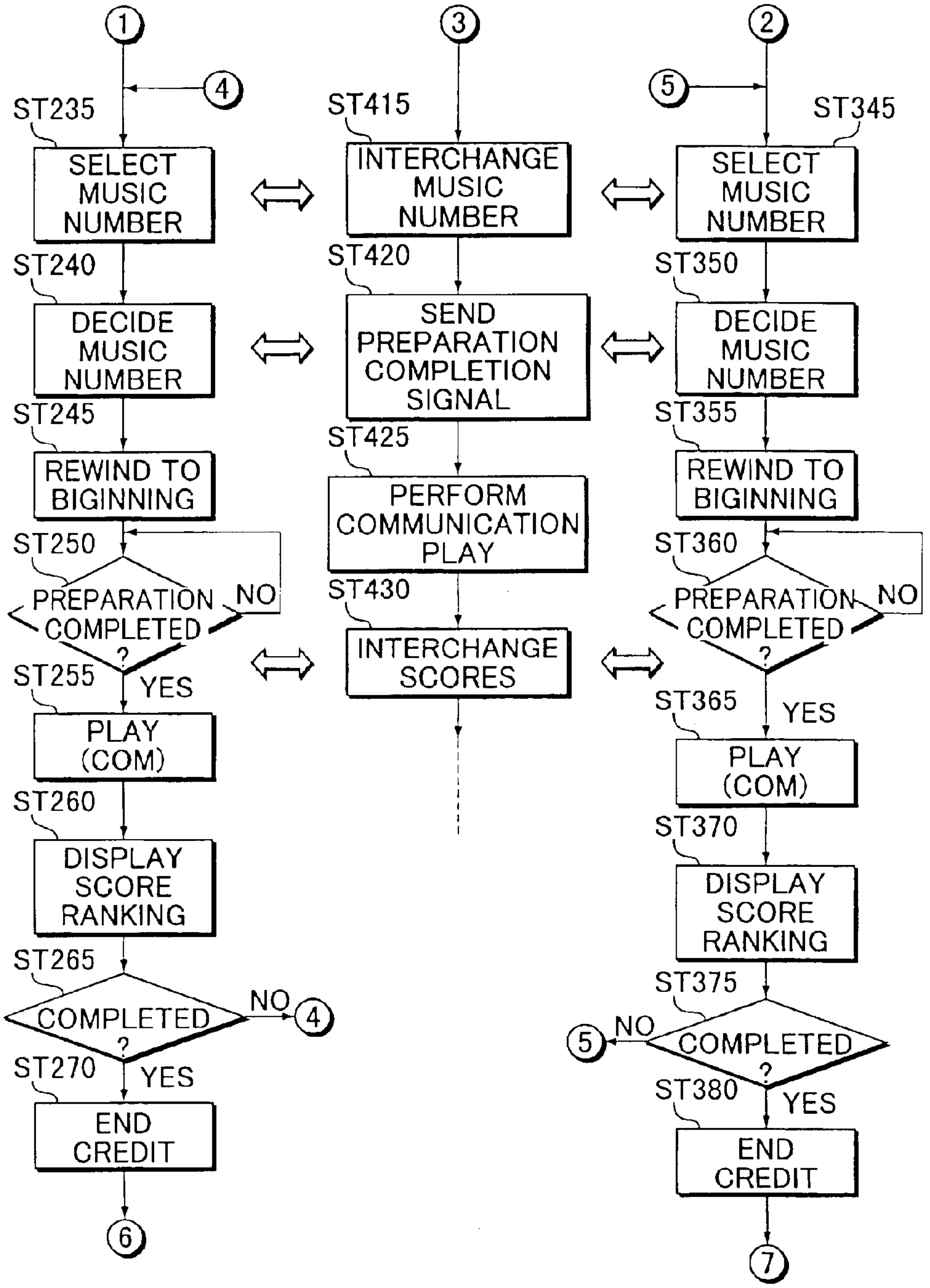

Since the single game player is playing the game in the multi-play mode in FIG. 5, only one image 105*d* simulating a dancer is displayed at the left end of the monitor 105 in the music number selection screen displayed in Step ST125 of FIG. 4. Here, if a red team is, for example, selected in Step ST120 of FIG. 4, the image 105*d* is displayed in red. In the score screen displayed in Step ST135 of FIG. 4, the name of the player’s own team (red team in this example) and the player’s score (740 points in this example) are displayed as shown in FIG. 6. FIGS. 7 and 8 are a flowchart showing an operation procedure in the case that, while a single game player is playing a game in the multi-play mode, another game player selects the multi-player mode to participate in the middle. The second game player can participate in the game in the middle when the first game player already playing the game selected the multi-play mode and the second game player also selects the multi-play mode. Here, description is given on an example in which the second game player participated in the game in the middle using the second game apparatus 200 while the first game player is playing using the first game apparatus 100.

In FIGS. 7 and 8, a flowchart executed in the first game apparatus 100 is shown by Steps ST200 to ST270 at the left end, a flowchart executed in the second game apparatus 200 is shown by Steps ST300 to ST380 at the right end, and contents relating to the communication between the first and second game apparatus 100, 200 are shown by Steps ST400 to ST430 in the middle.

In FIG. 7, when the first and second game apparatus 100, 200 are powered, demonstration screens are displayed, respectively (Step ST200, ST300). When a coin is inserted in the first game apparatus 100 while the demonstration screen is being displayed, the game mode selection screen is displayed, the multi-play mode is selected and a team is selected (Steps ST200 to ST215). Since data including a music number data have not yet been transmitted from the other game apparatus when the multi-play mode is selected, the music number is selected next (Step ST220) and a single-player game is started (Step ST225).

During the game, the music number data including the music number code and the count value and the name of the selected team are constantly transmitted to the communication cable 500 in a specified sampling cycle (Step ST400).

When a coin is inserted in the first game apparatus 100 while the demonstration screen is being displayed, the game mode selection screen is displayed and the multi-play mode is selected (Steps ST305 to ST310). Here, since the music number data and the other data are transmitted from the first game apparatus when the multi-play mode is selected, these data are received by the communication controller 245 (Step ST315) and a team is selected (Step ST320).

Next, a reproducing position of the music number being presently reproduced in the first game apparatus 100 is calculated in a procedure to be described later (Step ST325) and the game is started (Step ST330).

From this point of time on, a communication play is performed in both the first and second game apparatus 100, 200 (Step ST405).

Upon the completion of reproduction of the music number, a score is displayed on the monitor 105 of the first game apparatus 100 only for a predetermined time (Step ST230).

Upon the completion of the score display, a score display completion signal is sent from the communication controller 145 of the first game apparatus 100 to the communication cable 500 (Step ST410).

Since no score can be calculated for the game player of the second game apparatus 200 since he participated in the game in the middle, a standby screen is displayed on the monitor 205 of the second game apparatus 200 (Step ST335) and continues to be displayed until the score display completion signal is received (NO in Step ST340). Upon the receipt of this signal, the display of the standby screen is completed (YES in Step ST340).

Next, the music number is selected in each of the first and second game apparatus 100, 200 (Step ST235, ST345). The selected music numbers are interchanged (Step ST415). Subsequently, the music number is decided (Steps ST240, ST350). The music number may be decided by majority or by giving a priority to the game player who started the game first.

Next, the decided music number is rewound to the beginning, i.e., the corresponding music data is transferred to the sound source memories 142, 242 (Steps ST245 and ST355). The game apparatus having completed the preparation of the reproduction sends a preparation completion signal (Step ST420).

Next, the game system waits until the preparation of the other game apparatus is completed (NO in Step ST250 or ST360), and the game is started in the respective game apparatus (Steps ST255, ST365) upon the receipt of the preparation completion signal from the other game apparatus (YES in Step ST250 or ST365).

In this way, both the first and second game apparatus 100, 200 perform a communication play (Step ST425).

Upon the completion of reproduction of the music number, scores are calculated based on the evaluation results and the calculated scores are interchanged (Step ST430).

The scores and ranking are displayed on the respective monitors using the interchanged scores (Steps ST260, ST370).

It is then discriminated whether the music numbers have been reproduced by the set number of times (Steps ST265, ST375). Unless otherwise (No in Steps ST265, ST375), the above operations are repeated by returning to Steps ST235, ST345.

After the music numbers were reproduced by the set number of times (YES in Steps ST265, ST375), the demonstration screen is displayed (Steps ST200, ST300) after an end credit is displayed (Step ST270, ST380).

Figure 9:
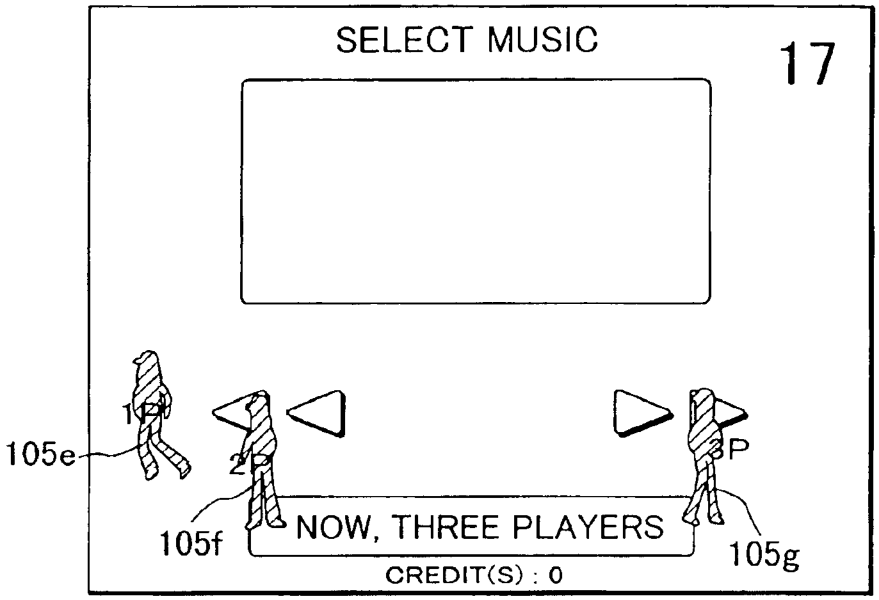
FIG. 9 is a diagram showing an example of the monitor display screen (music selection screen) when three game players select the multi-play mode.
Figure 10:
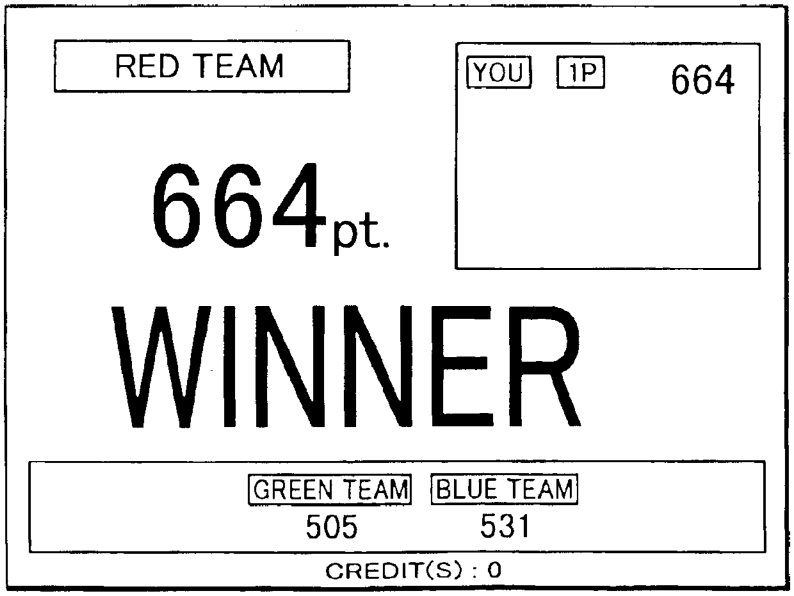
FIG. 10 is a diagram showing an example of the monitor display screen (score screen) when three game players select the multi-play mode.

FIGS. 9 and 10 are diagrams showing examples of the monitor display screens when three game players select the multi-play mode. FIG. 9 shows a music number selection screen and FIG. 10 shows a score screen.

Since three game players are playing the game in the multi-play mode in FIG. 9, images 105*e* (1$^{st}$ player), 105*f* (2$^{nd}$ player) and 105*g* (3$^{rd}$ player) simulating dancers are displayed in the music number selection screen displayed in Step ST235 of FIG. 8. These dancer-simulating images are displayed in colors corresponding to the names of teams.

Further, in the score screen displayed in Step ST260 of FIG. 8, the name of the 1$^{st}$ player's team (red team in this example) and his score (664 points in this example), the names of the other teams (green team and blue team in this example) and their scores (505 points, 531 points in this example), and that the 1$^{st}$ player is a winner are displayed as shown in FIG. 10.

Figure 11:
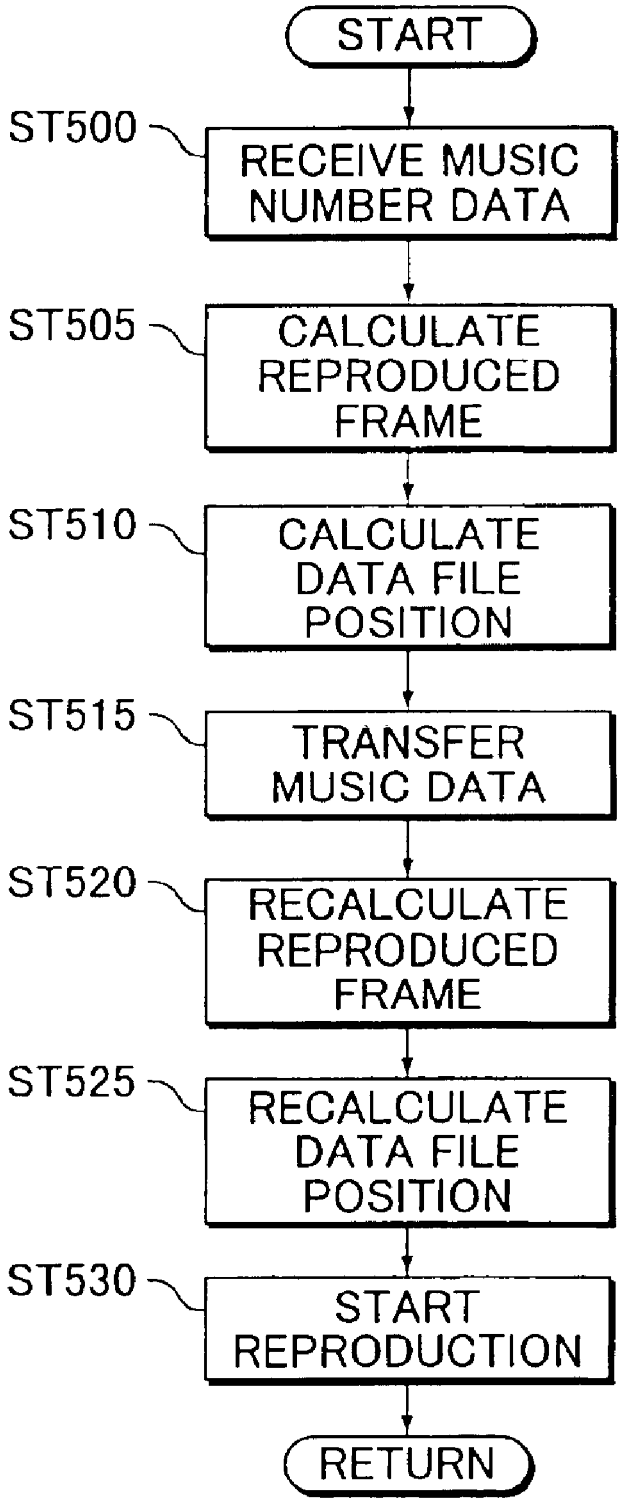
FIG. 11 is a flowchart showing a procedure of calculating a reproducing position of a music number.

Next, a procedure of calculating the reproducing position of the music number which is performed in Step ST325 of FIG. 7 is described with reference to a flowchart of FIG. 11.

Upon the receipt of the music number data (Step ST500), the frame being reproduced is calculated using the count value outputted from the first game apparatus 100 (Step ST505). If P1, Q1 denote the count value and the frame being reproduced, respectively, the frame Q1 is given by:

$$Q1=P1/44100\times 38.28 \quad (1)$$

It should be noted that Q1 is a maximum integer not exceeding the right side of equation (1) since Q1 is an integer.

Subsequently, a byte number R1 from which on the music data should be read from the music data storage 222 is calculated based on the frame Q1 (Step ST510). The byte number R1 is calculated by:

$$R1=Q1\times 418 \quad (2).$$

Subsequently, the game controller 234 loads the music data corresponding to the music number from the (R1)th byte from the leading end up to the rear end in the main memory 232, and transfers them to the sound source memory 242 (Step ST515).

When a sufficient amount of data to be reproduced is transferred to the sound source memory 242, the count value is read again and the frame is recalculated (Step ST520), and the position on the data file is recalculated (Step ST525). This is done in consideration of the fact that the reproduction of the music in the first game apparatus 100 further progresses during the data transfer in Step ST515.

Since the music data of (R1)th byte to the last byte are stored in the sound source memory 242, if the recalculated byte number is assumed to be R2, an instruction signal is sent from the game controller 234 to the sound source controller 243 so that the reproduction of the music number is started from the (R2–R1)th byte, and the music number is reproduced accordingly (Step ST530).

According to the above procedure, an error of less than ($1/38.28$)sec. occurs. However, such an error is negligible in the light of sense of hearing.

As described above, according to this embodiment, when the music number is reproduced from the leading end in any of the first to fourth game apparatus 100 to 400, the count value corresponding to the lapse of time from the starting point of the reproduction is outputted to the communication cable 500. When another game player starts the game in an other game apparatus, the reproducing position of the music in the one game apparatus is calculated using the count value. Thus, in synchronism with the music being reproduced in the one game apparatus, the reproduction of this music can be started in the other game apparatus, permitting another game player to participate in the music game in the middle. This makes the music game more diverse, thereby making it more interesting.

Further, since the first to fourth game apparatus 100 to 400 have the identical construction, other game player(s) can participate in the game in the middle using any one of the remaining game apparatus regardless of in which game apparatus the first game player plays the music game.

The present invention is not limited to the foregoing embodiment and may be embodied in following manners (1) to (6).

(1) Although the game system is constructed by a total of four game apparatus, i.e., the first to fourth game apparatus 100 to 400 in the foregoing embodiment, the present invention is not limited thereto. The game system may be constructed by two, three, five or more game apparatus.

(2) Although the wired communication path provided with the communication cable 500 is formed in the foregoing embodiment, the present invention is not limited thereto. For instance, a wireless communication path may be formed using infrared rays.

(3) That the music numbers stored in the music data storage 122 of the first game apparatus 100 and those stored in the music data storage 222 of the second game apparatus 200 are identical is preferable because all the music numbers can be used for the multi-mode play. However, only part of the music numbers may be identical. In such a case, the music number may be selected from a group of the identical music numbers in the multi-play mode.

(4) Although the count value is constantly outputted from the communication controller 145 to the communication cable 500 when the reproduction of the music number is started from the beginning in the multi-play mode in the first game apparatus 100 in the foregoing embodiment, the present invention is not limited thereto. For example, the sound source controller 143 may hold the count value from the starting point of the reproduction. When the multi-play mode is selected in the other game apparatus, e.g., the second game apparatus 200, the instruction signal given from the confirmation button 204*c* of the instructing section 204 and representing confirmation of the selection of the multi-play mode is sent from the communication controller (second start instructing signal transmitter) to the communication cable 500. The communication controller 145 may output the count value to the communication cable 500 upon the receipt of the instruction signal from the communication cable 500.

In the case that a sequence of playing the game in the first and second game apparatus 100, 200 is reversed in this embodiment, the communication controller 145 of the first game apparatus 100 may have a function as a first start instructing signal transmitter for sending the instruction signal given from the confirmation button 204*c* of the instructing section 204 and representing confirmation of the selection of the multi-play mode to the communication cable 500.

(5) In the foregoing embodiment, the first to fourth game apparatus 100 to 400 have the identical construction, so that, even if a first game player plays the music game using any of the game apparatus, other game player(s) can participate in the game in the middle using any of the remaining game apparatus. However, the present invention is not limited thereto. For instance, other game player(s) can participate in the game in the middle using any of the second to fourth game apparatus 200 to 400 only when the first game player plays the music game using the first game apparatus 100.

In such a case, it is sufficient to output the count value to the communication cable 500 only from the first game apparatus and, accordingly, the second to fourth game apparatus 200 to 400 need not have a function of outputting the count value to the communication cable 500. In addition, the first game apparatus needs not have a function of calculating the reproducing positions in the second to fourth game apparatus 200 to 400.

(6) In the foregoing embodiment, the first game apparatus 100 is provided as the first motion inputting sections with the stepping sections 113*a*, 113*b*, 113*c*, 113*d*, 113*e*, 113*f* on which the game player steps, and as the first motion instructor with the game controller 134 for instructing the stepping sections to be stepped and the stepping timings to the game player by scroll-displaying the stepping position instructing data on the monitor 105 in synchronism with the music being reproduced through the loudspeakers 106. Likewise, the second game apparatus 200 is provided with the stepping sections 213*a*, 213*b*, 213*c*, 213*d*, 213*e*, 213*f* as the second motion inputting sections and the game controller 234 as the second motion instructor. The dancing game system is constructed by these first and second game apparatus. However, the present invention is not limited to such a dancing game system, and may be applied to any generally known music game system.

For example, instead of the stepping sections, first and second simulated string units each comprised of a plurality of simulated strings to be touched by fingers of a game player may be provided as the first and second motion inputting sections. The present invention may be applied to a guitar game system which is provided with such first and second simulated string units and game controllers 134, 234 for instructing the simulated strings to be touched and touching timings to the game player.

Alternatively, instead of the stepping sections, first and second simulated drum units comprised of a plurality of simulated drums to be beaten by drumsticks held by a game player may be provided as the first and second motion inputting sections. The present invention may be applied to a drum game system which is provided with such first and second simulated drum units and game controllers 134, 234 for instructing the simulated drums to be beaten and beating timings to the game player.

As described above, an inventive music game system comprises: a first music game apparatus for reproducing a music for a first player; and a second music game apparatus communicable with the first music game apparatus by way of a communication path for reproducing a music for a second player. The first music game apparatus includes: a first music data storage device for storing music data of a music number; a first music reproducer for reproducing the music for the music number based on the music data stored in the first music data storage device; a first start instructor for instructing the start of reproduction of the music number by the first music reproducer; a first reproduction controller for transferring the music data from the first music data storage device to the first music reproducer upon the receipt of an instruction from the first start instructor; and a first count value output device for outputting to the communication path a count value corresponding to the lapse of time from a starting point of the reproduction when the reproduction of the music number is started by the first music reproducer. The second music game apparatus includes: a second music data storage device for storing the same music data as the first music data storage device: a second music reproducer for reproducing the music for the music number based on the music data stored in the second music data storage device; a second start instructor for instructing the start of reproduction of the music by the second music reproducer; a second reproducing position calculator for receiving the count value outputted from the first count value output device via the communication path upon the receipt of an instruction from the second start instructor, and calculating a reproducing position of the music number being reproduced by the first music reproducer using the received count value; and a second reproduction controller for transferring the music data after the reproducing position calculated by the second reproducing position calculator from the second music data storage device to the second music reproducer.

With thus constructed music game system, accordingly, while a music is being reproduced in the first game apparatus, the music can be reproduced in the second music game apparatus in synchronism with the one being reproduced in the first game apparatus. Thus, while one game player is playing the game using the first music game apparatus, another game player can participate in the game in the middle using the second music game apparatus, making the game system more diverse.

Each of the first and second music data storage devices may store music data having a data configuration comprised of a plurality of frames divided by a specified reproducing time. In this case, the second reproducing position calculator calculates a frame corresponding to a reproducing position of the music number using the specified reproducing time and the received count value.

Accordingly, the frame corresponding to the reproducing position can be easily obtained by calculating the lapse of time from the starting point of the reproduction based on the count value and dividing this lapse of time by the specified reproducing time.

The first music data storage device may store music data of a plurality of music numbers. In this case, the first music game apparatus may be preferably further provided with a first music number information output device for outputting information on the music number being reproduced by the first music reproducer to the communication path, and the second reproduction controller obtains the information outputted from the first music number information output device, and transfers the music data of the same music number as the one being reproduced by the first music reproducer from the second music data storage device to the second music reproducer.

Thus, the music data of the same music number as the one being reproduced by the first music reproducer can be reproduced from the calculated reproducing position on in the second music game apparatus by outputting the information on the music number being reproduced by the first music reproducer to the communication path.

It may be preferable that the second music game apparatus is further provided with a second start instructing signal transmitter for transmitting the instruction from the second start instructor to the communication path, and the first count value output device outputs the count value to the communication path upon the receipt of the instruction from the second start instructor via the communication path.

Accordingly, the count value is outputted to the communication path from the first count value output device only when the count value is necessary in the second music game apparatus.

Also, an inventive music game system comprises: a first music game apparatus for reproducing a music for a first player; and a second music game apparatus communicable with the first music game apparatus by way of a communication path for reproducing a music for a second player. The first music game apparatus includes: a first music data storage device for storing music data of a music number; a first music reproducer for reproducing the music for the music number based on the music data stored in the first music data storage device; a first start instructor for instructing the start of reproduction of the music number by the first music reproducer; a first reproduction controller for transferring the music data from the first music data storage device to the first music reproducer upon the receipt of an instruction from the first start instructor; and a first count value output device for outputting to the communication path a count value corresponding to the lapse of time from a starting point of the reproduction when the reproduction of the music number is started from the beginning by the first music reproducer. The second music game apparatus includes: a second music data storage device for storing the same music data as the first music data storage device; a second music reproducer for reproducing the music for the music number based on the music data stored in the second music data storage device; a second start instructor for instructing the start of reproduction of the music number by the second music reproducer; a second reproduction controller for transferring the music data from the second music data storage device to the second music reproducer upon the receipt of the instruction from the second start instructor; a second count value output device for outputting to the communication path a count value corresponding to the lapse of time from a starting point of the reproduction when the reproduction of the one music number is started from the beginning by the second music reproducer.

The first music game apparatus further includes: a first reproducing position calculator for obtaining the count value upon the receipt of the instruction from the first start instructor if the count value is outputted from the second count value output device to the communication path, and calculating a reproducing position of the music number being reproduced by the second music reproducer using the obtained count value; and the first reproduction controller transfers the music data after the reproducing position calculated by the first reproducing position calculator from the first music data storage device to the first music reproducer upon the receipt of the instruction from the first start instructor if the count value is outputted from the second count value output device to the communication path.

The second music game apparatus further includes: a second reproducing position calculator for obtaining the count value upon the receipt of the instruction from the second start instructor if the count value is outputted from the first count value output device to the communication path, and calculating a reproducing position of the music number being reproduced by the first music reproducer using the obtained count value; and the second reproduction controller transfers the music data after the reproducing position calculated by the second reproducing position calculator from the second music data storage device to the second music reproducer upon the receipt of the instruction from the second start instructor if the count value is outputted from the first count value output device to the communication path.

Accordingly, while a music is being reproduced in either one of the first and second music game apparatus, the music can be reproduced in the other music game apparatus in synchronism with the music being reproduced in the one music game apparatus. Therefore, while one game player is playing the game using either one of the first and second music game apparatus another game player can participate in the game in the middle using the other music game apparatus, thereby making the game system more diverse. Further, the operability of the game system can be improved since the second game player can participate in the game in the middle using either one of the music game apparatus.

Each of the first and second music data storage devices may store music data having a data configuration comprised of a plurality of frames divided by a specified reproducing time. In this case, each of the first and second reproducing position calculators calculates a frame corresponding to a reproducing position using the specified reproducing time and the count values.

Accordingly, the frame corresponding to the reproducing position can be easily obtained by calculating the lapse of time from the starting point of the reproduction based on the count value and dividing this lapse of time by the specified reproducing time.

Each of the first and second music data storage devices may store music data of a plurality of music numbers. In this case, the first music game apparatus may further include a first music number information output device for outputting information on the music number being reproduced by the first music reproducer to the communication path. The second music game apparatus may further include a second music number information output device for outputting information on the music number to be reproduced by the second music reproducer to the communication path. The first reproduction controller obtains the information outputted from the second music number information output device upon the receipt of the instruction from the first start instructor, and transfers the music data of the same music number as the one being reproduced by the second music reproducer from the first music data storage device to the first music reproducer. The second reproduction controller obtains the information outputted from the first music number information output device upon the receipt of the instruction from the second start instructor, and transfers the music data of the same music number as the one being reproduced by the first music reproducer from the second music data storage device to the second music reproducer.

Accordingly, the music data of the same music number as the one being reproduced by the first music reproducer can be reproduced from the calculated reproducing position in the second music game apparatus, whereas the music data of the same music number as the one being reproduced by the second music reproducer can be reproduced from the calculated reproducing position in the first music game apparatus.

The first music game apparatus may be further provided with a first start instructing signal transmitter for transmitting the instruction from the first start instructor to the communication path. The second music game apparatus may be further provided with a second start instructing signal transmitter for transmitting the instruction from the second start instructor to the communication path. The first count value output device outputs the count value to the communication path when the instruction is sent from the second start instructor to the communication path, and the second count value output device outputs the count value to the communication path when the instruction is sent from the first start instructor to the communication path.

Accordingly, the count value is outputted to the communication path from the first count value output device only when the count value is necessary in the second music game apparatus, whereas the count value is outputted to the communication path from the second count value output device only when the count value is necessary in the first music game apparatus.

The first music game apparatus may be further provided with: a first motion inputting unit to which a game player inputs a specified motion; and a first motion instructor for instructing the specified motion to the first motion inputting unit to the game player in synchronism with the music reproduced by the first music reproducer. And, the second music game apparatus may be further provided with: a second motion inputting unit to which a game player inputs the specified motion; and a second motion instructor for instructing the specified motion to the second motion inputting unit to the game player in synchronism with the music reproduced by the second music reproducer.

Accordingly, a music game full of throbbing excitements can be realized. Another game player can participate in this music game in the middle in addition to the game player already playing this game. This increases competitiveness of the music game.

The first motion inputting unit may be provided with a plurality of motion inputting sections to which a game player input the specified motion. And, the second motion inputting unit may be provided with a plurality of motion inputting sections to which a game player input the specified motion. The first motion instructor instructs to the game player a motion inputting section to which and a timing at which the game player inputs the specified motion. The second motion instructor instructs to the game player a motion inputting section to which and a timing at which the game player inputs the specified motion.

Accordingly, a music game full of throbbing excitements and motions can be realized.

Each of the first and second motion inputting sections may be comprised of a plurality of stepping sections on which the game player step. And, each of the first and second motion instructors instructs a stepping section to be stepped and a stepping timing to the game player.

Thus, a dancing game can be realized as a music game full of throbbing excitements and motions.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A music game system comprising:

a first music game apparatus for reproducing music for a first player; and a second music game apparatus communicable with the first music game apparatus by way of a communication path for reproducing music for a second player;

wherein the first music game apparatus includes:

a first music data storage device for storing music data of a music number;

a first music reproducer for reproducing the music for the music number based on the music data stored in the first music data storage device;

a first start instructor for instructing the start of reproduction of the music number by the first music reproducer;

a first reproduction controller for transferring the music data from the first music data storage device to the first music reproducer upon the receipt of an instruction from the first start instructor; and a first count value output device for outputting to the communication path a count value corresponding to the lapse of time from a starting point of the reproduction when the reproduction of the music number is started by the first music reproducer; and wherein the second music game apparatus includes:

a second music data storage device for storing the same music data as the first music data storage device;

a second music reproducer for reproducing the music for the music number based on the music data stored in the second music data storage device;

a second start instructor for instructing the start of reproduction of the music by the second music reproducer;

a second reproducing position calculator for receiving the count value outputted from the first count value output device via the communication path upon the receipt of an instruction from the second start instructor, and calculating a reproducing position of the music number being reproduced by the first music reproducer using the received count value; and a second reproduction controller for transferring the music data after the reproducing position calculated by the second reproducing position calculator from the second music data storage device to the second music reproducer.

2. A music game system according to claim 1, wherein:

each of the first and second music data storage devices stores music data having a data configuration comprised of a plurality of frames divided by a specified reproducing time; and the second reproducing position calculator calculates a frame corresponding to a reproducing position of the music number using the specified reproducing time and the received count value.

3. A music game system according to claim 2, wherein:

the first music data storage device stores music data of a plurality of music numbers;

the first music game apparatus further includes a first music number information output device for outputting information on the music number being reproduced by the first music reproducer to the communication path;

the second reproduction controller obtains the information outputted from the first music number information output device, and transfers the music data of the same music number as the one being reproduced by the first music reproducer from the second music data storage device to the second music reproducer.

4. A music game system according to claim 3, wherein:

the second music game apparatus further includes a second start instructing signal transmitter for transmitting the instruction from the second start instructor to the communication path; and the first count value output device outputs the count value to the communication path upon the receipt of the instruction from the second start instructor via the communication path.

5. A music game system according to claim 1, wherein:

the first music data storage device stores music data of a plurality of music numbers;

the first music game apparatus further includes a first music number information output device for outputting information on the music number being reproduced by the first music reproducer to the communication path;

the second reproduction controller obtains the information outputted from the first music number information output device, and transfers the music data of the same music number as the one being reproduced by the first music reproducer from the second music data storage device to the second music reproducer.

6. A music game system according to claim 1, wherein:

the second music game apparatus further includes a second start instructing signal transmitter for transmitting the instruction from the second start instructor to the communication path; and the first count value output device outputs the count value to the communication path upon the receipt of the instruction from the second start instructor via the communication path.

7. A music game system according to claim 1, wherein the first music game apparatus further includes:

a first motion inputting unit to which a game player inputs a specified motion; and a first motion instructor for instructing the specified motion to the first motion inputting unit to the game player in synchronism with the music reproduced by the first music reproducer; and the second music game apparatus further includes:

a second motion inputting unit to which a game player inputs the specified motion; and a second motion instructor for instructing the specified motion to the second motion inputting unit to the game player in synchronism with the music reproduced by the second music reproducer.

8. A music game system according to claim 7, wherein:

the first motion inputting unit includes a plurality of motion inputting sections to which a game player input the specified motion;

the second motion inputting unit includes a plurality of motion inputting sections to which a game player input the specified motion;

the first motion instructor instructs to the game player a motion inputting section to which and a timing at which the game player inputs the specified motion; and the second motion instructor instructs to the game player a motion inputting section to which and a timing at which the game player inputs the specified motion.

9. A music game system according to claim 8, wherein:

each of the first and second motion inputting sections is comprised of a plurality of stepping sections on which a corresponding one of said first and second game players steps; and each of the first and second motion instructors instructs a stepping section to be stepped and a stepping timing to the game player.

10. A music game system comprising:

a first music game apparatus for reproducing a music for a first player; and a second music game apparatus communicatable with the first music game apparatus by way of a communication path for reproducing a music for a second player;

wherein the first music game apparatus includes:

a first music data storage device for storing music data of a music number;

a first music reproducer for reproducing the music for the music number based on the music data stored in the first music data storage device;

a first start instructor for instructing the start of reproduction of the music number by the first music reproducer;

a first reproduction controller for transferring the music data from the first music data storage device to the first music reproducer upon the receipt of an instruction from the first start instructor; and a first count value output device for outputting to the communication path a count value corresponding to the lapse of time from a starting point of the reproduction when the reproduction of the music number is started from the beginning by the first music reproducer;

wherein the second music game apparatus includes:

a second music data storage device for storing the same music data as the first music data storage device;

a second music reproducer for reproducing the music for the music number based on the music data stored in the second music data storage device;

a second start instructor for instructing the start of reproduction of the music number by the second music reproducer;

a second reproduction controller for transferring the music data from the second music data storage device to the second music reproducer upon the receipt of the instruction from the second start instructor;

a second count value output device for outputting to the communication path a count value corresponding to the lapse of time from a starting point of the reproduction when the reproduction of the one music number is started from the beginning by the second music reproducer;

wherein the first music game apparatus further includes:

a first reproducing position calculator for obtaining the count value upon the receipt of the instruction from the first start instructor if the count value is outputted from the second count value output device to the communication path, and calculating a reproducing position of the music number being reproduced by the second music reproducer using the obtained count value; and the first reproduction controller transfers the music data after the reproducing position calculated by the first reproducing position calculator from the first music data storage device to the first music reproducer upon the receipt of the instruction from the first start instructor if the count value is outputted from the second count value output device to the communication path;

wherein the second music game apparatus further includes:

a second reproducing position calculator for obtaining the count value upon the receipt of the instruction from the second start instructor if the count value is outputted from the first count value output device to the communication path, and calculating a reproducing position of the music number being reproduced by the first music reproducer using the obtained count value; and the second reproduction controller transfers the music data after the reproducing position calculated by the second reproducing position calculator from the second music data storage device to the second music reproducer upon the receipt of the instruction from the second start instructor if the count value is outputted from the first count value output device to the communication path.

11. A music game system according to claim 10, wherein:

each of the first and second music data storage devices stores music data having a data configuration comprised of a plurality of frames divided by a specified reproducing time, and each of the first and second reproducing position calculators calculates a frame corresponding to a reproducing position using the specified reproducing time and the count values.

12. A music game system according to claim 11, wherein:

each of the first and second music data storage devices stores music data of a plurality of music numbers;

the first music game apparatus further includes a first music number information output device for outputting information on the music number being reproduced by the first music reproducer to the communication path;

the second music game apparatus further includes a second music number information output device for outputting information on the music number to be reproduced by the second music reproducer to the communication path;

the first reproduction controller obtains the information outputted from the second music number information output device upon the receipt of the instruction from the first start instructor, and transfers the music data of the same music number as the one being reproduced by the second music reproducer from the first music data storage device to the first music reproducer; and the second reproduction controller obtains the information outputted from the first music number information output device upon the receipt of the instruction from the second start instructor, and transfers the music data of the same music number as the one being reproduced by the first music reproducer from the second music data storage device to the second music reproducer.

13. A music game system according to claim 12, wherein:

the first music game apparatus further includes a first start instructing signal transmitter for transmitting the instruction from the first start instructor to the communication path;

the second music game apparatus further includes a second start instructing signal transmitter for transmitting the instruction from the second start instructor to the communication path;

the first count value output device outputs the count value to the communication path when the instruction is sent from the second start instructor to the communication path; and the second count value output device outputs the count value to the communication path when the instruction is sent from the first start instructor to the communication path.

14. A music game system according to claim 13, wherein the first music game apparatus further includes:

a first motion inputting unit to which a game player inputs a specified motion; and a first motion instructor for instructing the specified motion to the first motion inputting unit to the game player in synchronism with the music reproduced by the first music reproducer; and the second music game apparatus further includes:

a second motion inputting unit to which a game player inputs the specified motion; and a second motion instructor for instructing the specified motion to the second motion inputting unit to the game player in synchronism with the music reproduced by the second music reproducer.

15. A music game system according to claim 14, wherein:

the first motion inputting unit includes a plurality of motion inputting sections to which a game player input the specified motion;

the second motion inputting unit includes a plurality of motion inputting sections to which a game player input the specified motion;

the first motion instructor instructs to the game player a motion inputting section to which and a timing at which the game player inputs the specified motion; and the second motion instructor instructs to the game player a motion inputting section to which and a timing at which the game player inputs the specified motion.

16. A music game system according to claim 15, wherein:

each of the first and second motion inputting sections is comprised of a plurality of stepping sections on which a corresponding one of said first and second game players steps; and each of the first and second motion instructors instructs a stepping section to be stepped and a stepping timing to the game player.

17. A music game system according to claim 10, wherein:

each of the first and second music data storage devices stores music data of a plurality of music numbers;

the first music game apparatus further includes a first music number information output device for outputting information on the music number being reproduced by the first music reproducer to the communication path;

the second music game apparatus further includes a second music number information output device for outputting information on the music number to be reproduced by the second music reproducer to the communication path;

the first reproduction controller obtains the information outputted from the second music number information output device upon the receipt of the instruction from the first start instructor, and transfers the music data of the same music number as the one being reproduced by the second music reproducer from the first music data storage device to the first music reproducer; and the second reproduction controller obtains the information outputted from the first music number information output device upon the receipt of the instruction from the second start instructor, and transfers the music data of the same music number as the one being reproduced by the first music reproducer from the second music data storage device to the second music reproducer.

18. A music game system according to claim 10, wherein:

the first music game apparatus further includes a first start instructing signal transmitter for transmitting the instruction from the first start instructor to the communication path;

the second music game apparatus further includes a second start instructing signal transmitter for transmitting the instruction from the second start instructor to the communication path;

the first count value output device outputs the count value to the communication path when the instruction is sent from the second start instructor to the communication path; and the second count value output device outputs the count value to the communication path when the instruction is sent from the first start instructor to the communication path.

19. A music game system according to claim 10, wherein the first music game apparatus further includes:

a first motion inputting unit to which a game player inputs a specified motion; and a first motion instructor for instructing the specified motion to the first motion inputting unit to the game player in synchronism with the music reproduced by the first music reproducer; and the second music game apparatus further includes:

a second motion inputting unit to which a game player imputs the specified motion; and a second motion instructor for instructing the specified motion to the second motion inputting unit to the game player in synchronism with the music reproduced by the second music reproducer.

20. A music game system comprising:

a first music game apparatus for reproducing a music for a first player; and a second music game apparatus communicatable with the first music game apparatus by way of a communication path for reproducing a music for a second player;

wherein the first music game apparatus includes:

a first music data storage device for storing music data of a music number;

a first music reproducer for reproducing the music for the music number based on the music data stored in the first music data storage device;

a first start instructor for instructing the start of reproduction of the music number by the first music reproducer upon receipt of a first signal from an operation of a first switch by the first player;

a first reproduction controller for transferring the music data from the first music data storage device to the first music reproducer upon the receipt of an instruction from the first start instructor; and a first count value output device for outputting to the communication path a count value corresponding to the lapse of time from a starting point of the reproduction when the reproduction of the music number is started by the first music reproducer; and wherein the second music game apparatus includes:

a second music data storage device for storing the same music data as the first music data storage device;

a second music reproducer for reproducing the music for the music number based on the music data stored in the second music data storage device;

a second start instructor for instructing the start of reproduction of the music by the second music reproducer upon receipt of a second signal from an operation of a second switch by the second game player;

a second reproducing position calculator for receiving the count value outputted from the first count value output device via the communication path upon the receipt of an instruction from the second start instructor, and calculating a reproducing position of the music number being reproduced by the first music reproducer using the received count value; and a second reproduction controller for transferring the music data corresponding to a portion thereof after the reproducing position calculated by the second reproducing position calculator from the second music data storage device to the second music reproducer.

* * * * *